United States Patent
Ou et al.

(10) Patent No.: US 11,762,790 B2
(45) Date of Patent: Sep. 19, 2023

(54) METHOD FOR DATA SYNCHRONIZATION BETWEEN HOST SIDE AND FPGA ACCELERATOR

(71) Applicant: INSPUR SUZHOU INTELLIGENT TECHNOLOGY CO., LTD., Jiangsu (CN)

(72) Inventors: Mingyang Ou, Jiangsu (CN); Jiaheng Fan, Jiangsu (CN); Hongwei Kan, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/801,284

(22) PCT Filed: Jan. 7, 2021

(86) PCT No.: PCT/CN2021/070630
§ 371 (c)(1),
(2) Date: Aug. 22, 2022

(87) PCT Pub. No.: WO2021/164452
PCT Pub. Date: Aug. 26, 2021

(65) Prior Publication Data
US 2023/0098879 A1  Mar. 30, 2023

(30) Foreign Application Priority Data
Feb. 21, 2020 (CN) .......................... 202010108433.4

(51) Int. Cl.
*G06F 13/00* (2006.01)
*G06F 13/16* (2006.01)
*G06F 13/30* (2006.01)

(52) U.S. Cl.
CPC .......... *G06F 13/1689* (2013.01); *G06F 13/30* (2013.01)

(58) Field of Classification Search
CPC ...... G06F 13/00; G06F 13/1689; G06F 12/00; G06F 13/30
See application file for complete search history.

(56) References Cited

U.S. PATENT DOCUMENTS

| 2007/0073923 | A1 | 3/2007 | Vemula et al. |
| 2010/0145910 | A1* | 6/2010 | Zhao .................. G06F 16/2386 707/E17.005 |

(Continued)

FOREIGN PATENT DOCUMENTS

| CN | 102937939 A | 2/2013 |
| CN | 104035781 A | 9/2014 |

(Continued)

OTHER PUBLICATIONS

International Search Report of corresponding PCT application PCT/CN2021/070630, dated Apr. 6, 2021, 8 pages.

(Continued)

*Primary Examiner* — Tuan V Thai
(74) *Attorney, Agent, or Firm* — COOPER LEGAL GROUP, LLC

(57) ABSTRACT

Disclosed are a method for data synchronization between a host side and a Field Programmable Gate Array (FPGA) accelerator, a Bidirectional Memory Synchronize Engine (DMSE), a FPGA accelerator, and a data synchronization system. The method includes: in response to detection of data migration from a host side to a preset memory space, generating second state information according to first state information in a first address space, and writing the second state information to a second address space (S201); and in response to detection of the second state information in the second address space, calling Direct Memory Access (Continued)

(DMA) to migrate data in the preset memory space to a memory space of a FPGA accelerator, and copying the second state information to the first address space, so as to implement synchronization (S202).

20 Claims, 3 Drawing Sheets

(56) References Cited

U.S. PATENT DOCUMENTS

| | | | |
|---|---|---|---|
| 2011/0225256 A1 | 9/2011 | Seigneret et al. | |
| 2012/0278442 A1* | 11/2012 | Saika | G06F 3/0647 |
| | | | 709/219 |
| 2019/0004840 A1 | 1/2019 | Asaro et al. | |

FOREIGN PATENT DOCUMENTS

| | | |
|---|---|---|
| CN | 105607874 A | 5/2016 |
| CN | 105677491 A | 6/2016 |
| CN | 106844245 A | 6/2017 |
| CN | 107197182 A | 9/2017 |
| CN | 107870879 A | 4/2018 |
| CN | 108958800 A | 12/2018 |
| CN | 109240870 A | 1/2019 |
| CN | 109308280 A | 2/2019 |
| CN | 109558344 A | 4/2019 |
| CN | 109739786 A | 5/2019 |
| CN | 111367839 A | 7/2020 |
| EP | 0346917 A2 | 12/1989 |
| JP | 2004213565 A | 7/2004 |
| JP | 2012208755 A | 10/2012 |
| JP | 2013003692 A | 1/2013 |
| WO | 2014092551 A1 | 6/2014 |

OTHER PUBLICATIONS

Written Opinion of International Searching Authority of corresponding PCT application PCT/CN2021/070630, dated Apr. 6, 2021, 9 pages.
First Office Action of corresponding CN priority application CN202010108433.4, dated Feb. 2, 2021, 7 pages.
Chen, peng, "Study on the Heterogeneous Reconfigurable System on Chip targeting at the Big Data Applications" «China Doctoral Dissertations Full-text Database» 2015 No. 9 1138-17 Sep. 15, 2015, 140 pages, including English abstract.
Supplementary European Search Report of corresponding European Patent Application No. EP21756740.3, dated Mar. 31, 2023.
Mbakoyiannis, Dimitrios et al., "Energy-Performance Considerations for Data Offloading to FPGA-Based Accelerators Over PCIe", ACM Trans. Archit. Code Optim, Mar. 22, 2018, vol. 15, No. 1, Article 14, 24 pages.
Corresponding Japanese Patent Application No. 2022-539756, Office Action dated Dec. 20, 2022.

* cited by examiner

METHOD FOR DATA SYNCHRONIZATION BETWEEN HOST SIDE AND FPGA ACCELERATOR

This application claims priority to Chinese Patent Application No. 202010108433.4, filed on Feb. 21, 2020, in China National Intellectual Property Administration and entitled "Method for Data Synchronization Between Host Side and FPGA Accelerator", the contents of which are hereby incorporated by reference in its entirety.

FIELD

The present application relates to the technical field of computers, and particularly to a method for data synchronization between a host side and a Field Programmable Gate Array (FPGA) accelerator, a Bidirectional Memory Synchronize Engine (DMSE), a FPGA accelerator, and a data synchronization system.

BACKGROUND

Currently, all general-purpose computing systems use a Peripheral Component Interconnect Express (PCIe)-based local bus structure, as shown in FIG. 1. The structure, like a Peripheral Component Interconnect (PCI) bus, is mainly for connecting peripheral devices in a processing system, and a device mounted to the bus implements point-to-point data communication through a PCIe controller. Compared with Industry Standard Architecture (ISA), Enhanced Industry Standard Architecture (EISA), and Medium Access Control (MAC) buses, the PCIe bus has the advantages of spatial isolation between the bus and a processor, high extensibility, support to dynamic configuration, high end-to-end bus data bandwidth, etc.

As an acceleration device emerging nowadays, a FPGA mainly communicates with a processor through a PCIe bus. The FPGA acceleration device is a PCIe-Agent device (PCIe slave device), and has an independent on-board memory space for data storage. In an x86 architecture, address space conversion and physical signal conversion need to be completed by a Root Complex (RC) for data interaction between a processor and a FPGA. In some emerging application scenarios, a FPGA, as an acceleration device, needs to use data in a processor side, and copies data of a host side to a specified region of an accelerator-side on-board memory through a Direct Memory Access (DMA) controller of the FPGA side by use of an Open Computing Language (OpenCL) heterogeneous programming model.

A currently used software-instruction-based passive memory copying method includes an additional step for data synchronization. In PCIe, data is migrated by DMA or Base Address Register (Bar) space mapping during communication between a host and a FPGA. In the meantime, access of a controller is needed, and instructions are used for controlling the initiation and cancellation of read and write. During data migration, a specific code needs to be written to maintain data synchronization between both sides. The running of the code at the host side may bring the problems of unstable data migration response latency, etc. In key application scenarios such as Artificial Intelligence (AI) reasoning, this technical mode prolongs the memory operation latency of an application system and reduces the system throughput efficiency.

SUMMARY

An objective of the present application is to provide a method for data synchronization between a host side and a FPGA accelerator, a DMSE, a FPGA accelerator, and a data synchronization system, so as to solve the problem of relatively long synchronization latency of a conventional solution to synchronization between a host side and a FPGA accelerator. The specific solutions are as follows.

According to a first aspect, the present application provides a method for data synchronization between a host side and a FPGA accelerator, including:

in response to detection of data migration from a host side to a preset memory space, generating second state information according to first state information in a first address space and writing the second state information to a second address space, wherein the first address space and the second address space are different address spaces at the host side mapped by a Bar space, the first state information includes a previous data frame number and a present data frame number, and the second state information includes the present data frame number and a next data frame number; and in response to detection of the second state information in the second address space, calling DMA to migrate data in the preset memory space to a memory space of the FPGA accelerator and copying the second state information to the first address space, so as to implement synchronization.

Preferably, before the step of generating the second state information according to the first state information in the first address space in response to detection of data migration from the host side to the preset memory space, the method further includes:

reading and writing the first address space at the host side mapped by the Bar space to establish a memory synchronization communication link between the host side and the FPGA accelerator.

Preferably, before the step of generating the second state information according to the first state information in the first address space in response to detection of data migration from the host side to the preset memory space, the method further includes:

by the host side, reading the first state information from the first address space, determining the previous data frame number and the present data frame number according to the first state information, and judging whether a difference between the previous data frame number and the present data frame number is within a preset threshold to perform a reliability check on the memory synchronization communication link.

Preferably, after the step of judging whether the difference between the previous data frame number and the present data frame number is within the preset threshold to perform the reliability check on the memory synchronization communication link, the method further includes:

continuing, by the host side, the data migration to the preset memory space till an end of a frame in response to that the memory synchronization communication link not passing the reliability check within preset time.

Preferably, before the step of calling DMA to migrate data in the preset memory space to the memory space of the FPGA accelerator, the method further includes:

acquiring the second state information in the second address space, determining the present data frame number and the next data frame number according to the second state information, and judging whether a difference between the present data frame number and the next data frame number is within the preset threshold to perform the reliability check on the memory synchronization communication link.

Preferably, after the step of judging whether the difference between the present data frame number and the next data frame number is within the preset threshold to perform the reliability check on the memory synchronization communication link, the method further includes:

writing third state information to the second address space in response to that the memory synchronization communication link not passing the reliability check, so as to stop calling DMA to migrate data.

Preferably, the method further includes:

writing, by the host side, the third state information to the second address space so as to terminate synchronization.

According to a second aspect, the present application provides a DMSE, including:

a state information writing module, configured to, in response to detection of data migration from a host side to a preset memory space, generate second state information according to first state information in a first address space and write the second state information to a second address space, wherein the first address space and the second address space are different address spaces at the host side mapped by a Bar space, the first state information includes a previous data frame number and a present data frame number, and the second state information includes the present data frame number and a next data frame number; and a data migration module, configured to, in response to detection of the second state information in the second address space, call DMA to migrate data in the preset memory space to a memory space of a FPGA accelerator and copy the second state information to the first address space, so as to implement synchronization.

According to a third aspect, the present application provides a FPGA accelerator, including the DMSE as described above.

According to a fourth aspect, the present application provides a data synchronization system, including a host side and a FPGA accelerator. The FPGA accelerator includes the DMSE as described above.

The present application provides a method for data synchronization between a host side and a FPGA accelerator, including: in response to detection of data migration from a host side to a preset memory space, generating second state information according to first state information in a first address space, and writing the second state information to a second address space; and in response to detection of the second state information in the second address space, calling DMA to migrate data in the preset memory space to a memory space of the FPGA accelerator, and copying the second state information to the first address space, so as to implement synchronization. It can be seen that, according to the method, a data synchronization operation is implemented based on state information in two address spaces, and double-end memory data synchronization is performed by a controller at the side of the FPGA accelerator. Therefore, the processing pressure of the host side is alleviated, the data synchronization latency is reduced, and the system throughput efficiency is improved.

In addition, the present application also provides a DMSE, a FPGA accelerator, and a data synchronization system which technical effects correspond to those of the method, and will not be elaborated herein.

BRIEF DESCRIPTION OF THE DRAWINGS

In order to describe the technical solutions in embodiments of the present application or the prior art more clearly, the drawings needed to be used in descriptions about the embodiments or the prior art will be briefly introduced below. Apparently, the drawings in the description below are merely some embodiments of the present application. Those ordinarily skilled in the art may further obtain other drawings according to these drawings without creative work.

DETAILED DESCRIPTION

A core of the present application is to provide a method for data synchronization between a host side and a FPGA accelerator, a DMSE, a FPGA accelerator, and a data synchronization system. The data synchronization latency is reduced, and the system throughput efficiency is improved.

In order to make the solutions of the present application understood by those skilled in the art better, the present application will be further described below in detail in combination with the drawings and specific implementation modes. Clearly, the described embodiments are not all but only part of embodiments of the present application. All other embodiments obtained by those ordinarily skilled in the art based on the embodiments in the present application without creative work shall fall within the scope of protection of the present application.

Figure 1:
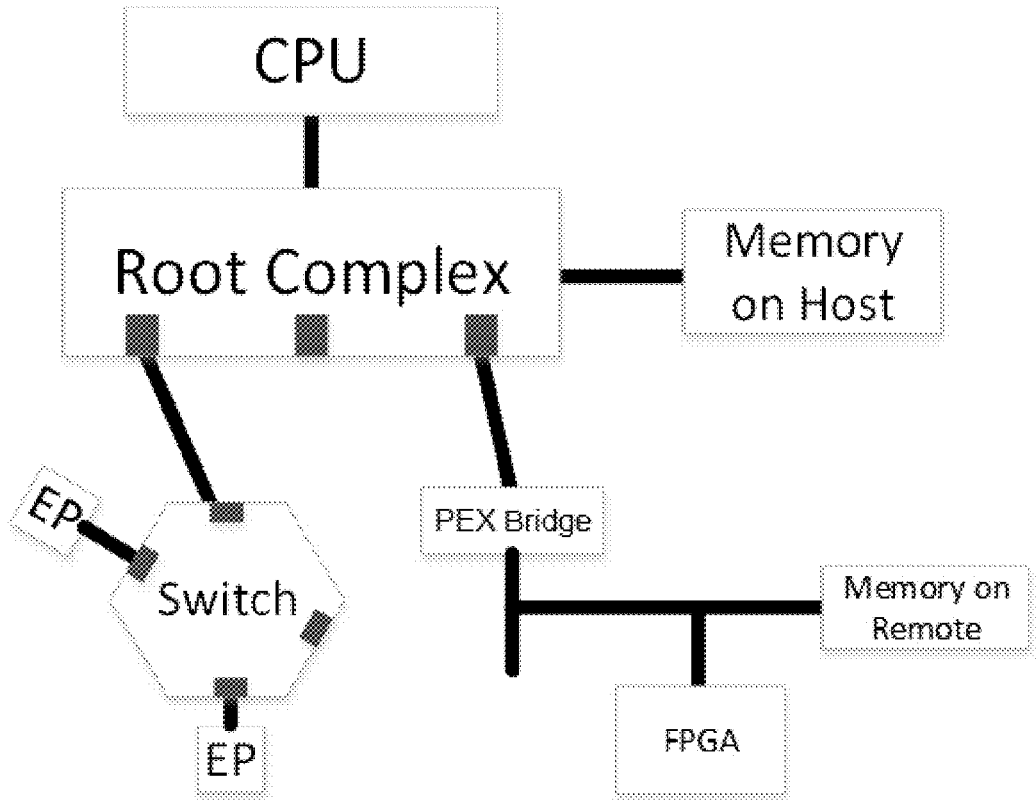
FIG. 1 is a schematic diagram of a PCIe-bus-based general-purpose processing system according to the present application.
Figure 2:
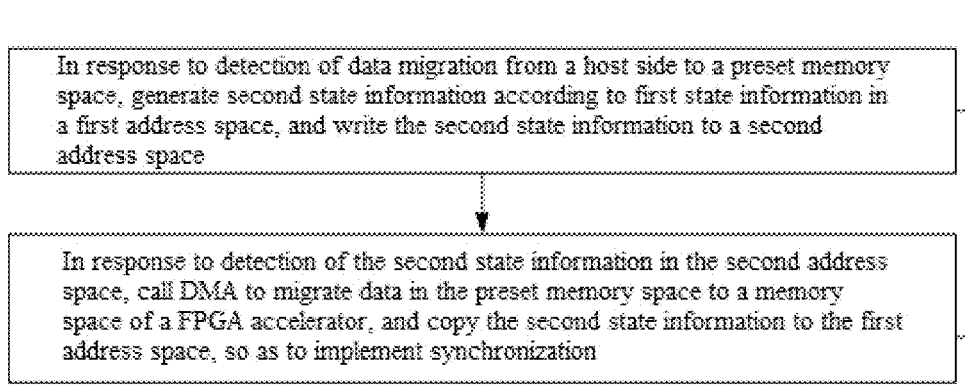
FIG. 2 is an implementation flowchart of embodiment 1 of a method for data synchronization between a host side and a FPGA accelerator according to the present application.

Embodiment 1 of a method for data synchronization between a host side and a FPGA accelerator in the present application will now be introduced. Referring to FIG. 2, embodiment 1 includes the following steps.

In S201, in response to detection of data migration from a host side to a preset memory space, second state information is generated according to first state information in a first address space, and the second state information is written to a second address space.

The first address space and the second address space are different address spaces at the host side mapped by a Bar space. The first state information includes a previous data frame number and a present data frame number. The second state information includes the present data frame number and a next data frame number In S202, in response to detection of the second state information in the second address space, DMA is called to migrate data in the preset memory space to a memory space of the FPGA accelerator, and the second state information is copied to the first address space, so as to implement synchronization.

The present embodiment aims to synchronize data of a host side to the side of a FPGA accelerator. The host side migrates data from another region of a disk or memory to a preset memory space. A DMSE calls DMA to migrate data in the preset memory space to a memory space of the FPGA accelerator, so as to implement data synchronization.

In practical applications, the DMSE may read and write a first address space at the host side mapped by a Bar space to establish a memory synchronization communication link between the host side and the FPGA accelerator, and write first state information to the first address space during initialization. The host side may check the first state information before data migration, and judge whether the memory synchronization communication link is reliable according to whether a difference between a previous data frame number and present data frame number in the first state information is 1. If YES, the host, after migrating the data to the preset memory space, generates second state information according to the first state information, and writes the second state information to a second address space.

Then, the DMSE reads the second state information first from the second address space, and judges whether a difference between the present data frame number and next data frame number in the second state information is 1. If YES, it is determined that the memory synchronization communication link is reliable, DMA is called to migrate the data in the preset memory space to the memory space of the FPGA accelerator, and the second state information is finally copied to the first address space, so as to implement state switching.

Data synchronization between the host side and the FPGA accelerator may be implemented according to the above-mentioned process. The data synchronization process may be ended in a manner that the DMSE, when detecting that the memory synchronization communication link is unreliable, terminates the synchronization operation actively and writes third state information to the second address space, or in a manner that the host side initiates synchronization termination actively and writes the third state information to the second address space such that the DMSE terminates the synchronization operation passively. The specific manner to be used may be determined as required by a practical scenario, and no limits are made in the present embodiment.

It is to be noted that, in the present embodiment, the first state information, the second state information, and the third state information are used for describing synchronization states. The first state information and the second state information may be updated along with data synchronization. However, the third state information, as information of terminating synchronization, is always unequal to the first state information or the second state information.

The present embodiment provides a method for data synchronization between a host side and a FPGA accelerator, including the following steps: in response to detection of data migration from a host side to a preset memory space, second state information is generated according to first state information in a first address space, and the second state information is written to a second address space; and in response to detection of the second state information in the second address space, DMA is called to migrate data in the preset memory space to a memory space of the FPGA accelerator, and the second state information is copied to the first address space, so as to implement synchronization. It can be seen that, according to the method, a data synchronization operation is implemented based on state information in two address spaces, and double-end memory data synchronization is performed by a controller at the side of the FPGA accelerator. Therefore, the processing pressure of the host side is alleviated, the data synchronization latency is reduced, and the system throughput efficiency is improved.

Embodiment 2 of a method for data synchronization between a host side and a FPGA accelerator in the present application will now be introduced in detail. Embodiment 2 is implemented based on embodiment 1, and some extensions are made based on embodiment 1.

Figure 3:
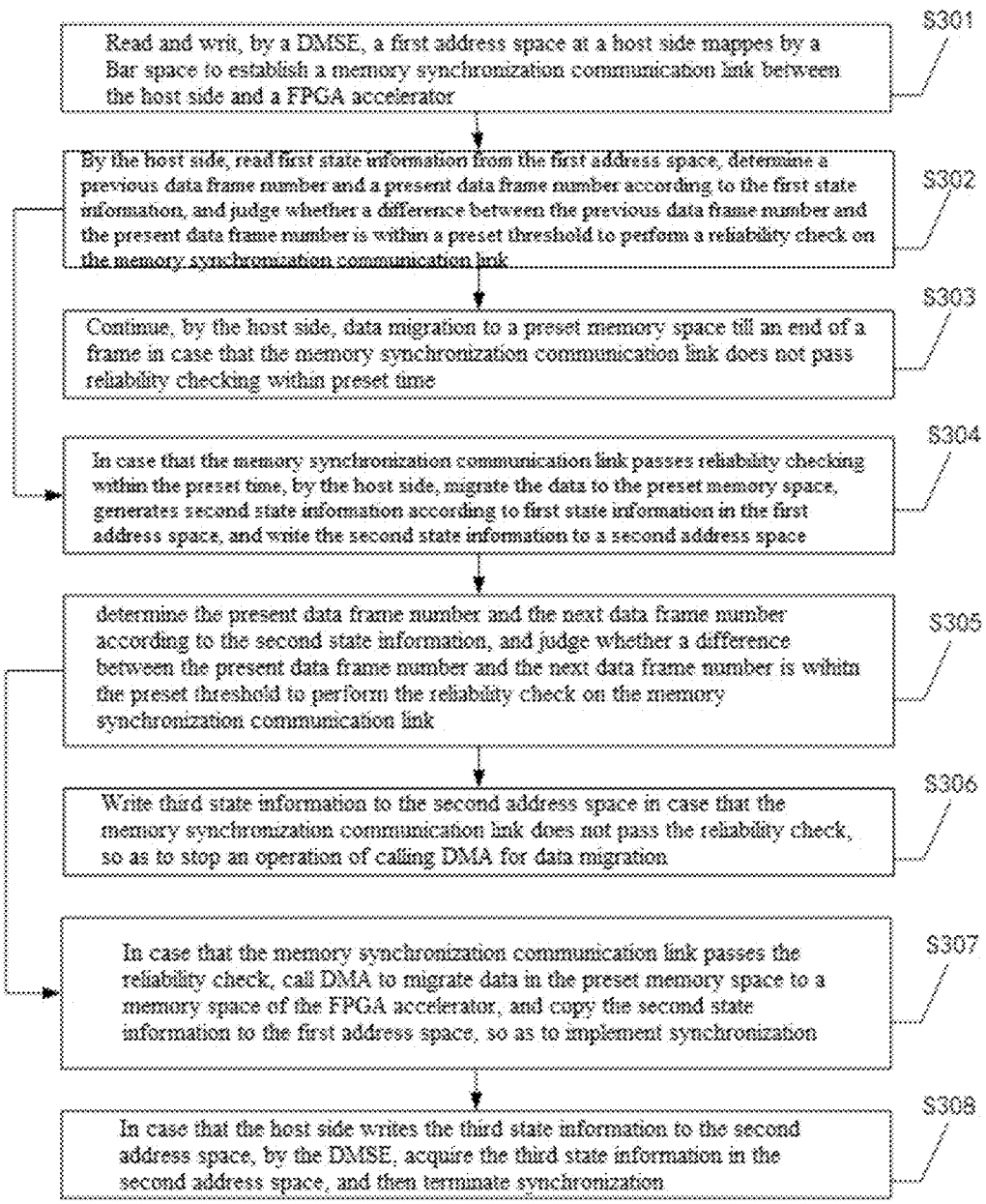
FIG. 3 is an implementation flowchart of embodiment 2 of a method for data synchronization between a host side and a FPGA accelerator according to the present application.

Referring to FIG. 3, embodiment 2 specifically includes the following steps.

In S301, a DMSE reads and writes a first address space at a host side mapped by a Bar space to establish a memory synchronization communication link between the host side and a FPGA accelerator.

In S302, the host side reads first state information from the first address space, determines a previous data frame number and a present data frame number according to the first state information, and judges whether a difference between the previous data frame number and the present data frame number is within a preset threshold to perform a reliability check on the memory synchronization communication link.

In S303, the host side continues migrating data to a preset memory space till an end of a frame in case that the memory synchronization communication link does not pass the reliability check within preset time.

In S304, in case that the memory synchronization communication link passes the reliability check within the preset time, the host side migrates the data to the preset memory space, generates second state information according to the first state information in the first address space, and writes the second state information to a second address space.

The first address space and the second address space are different address spaces at the host side mapped by the Bar space. The first state information includes the previous data frame number and the present data frame number. The second state information includes the present data frame number and a next data frame number.

In S305, the DMSE acquires the second state information in the second address space, determines the present data frame number and the next data frame number according to the second state information, and judges whether a difference between the present data frame number and the next data frame number is within the preset threshold to perform the reliability check on the memory synchronization communication link.

In S306, third state information is written to the second address space in case that the memory synchronization communication link does not pass the reliability check, so as to stop an operation of calling DMA for data migration.

In S307, in case that the memory synchronization communication link passes the reliability check, DMA is called to migrate data in the preset memory space to a memory space of the FPGA accelerator, and the second state information is copied to the first address space, so as to implement synchronization.

In S308, in case that the host side writes the third state information to the second address space, the DMSE acquires the third state information in the second address space, and then terminates synchronization.

Figure 4:
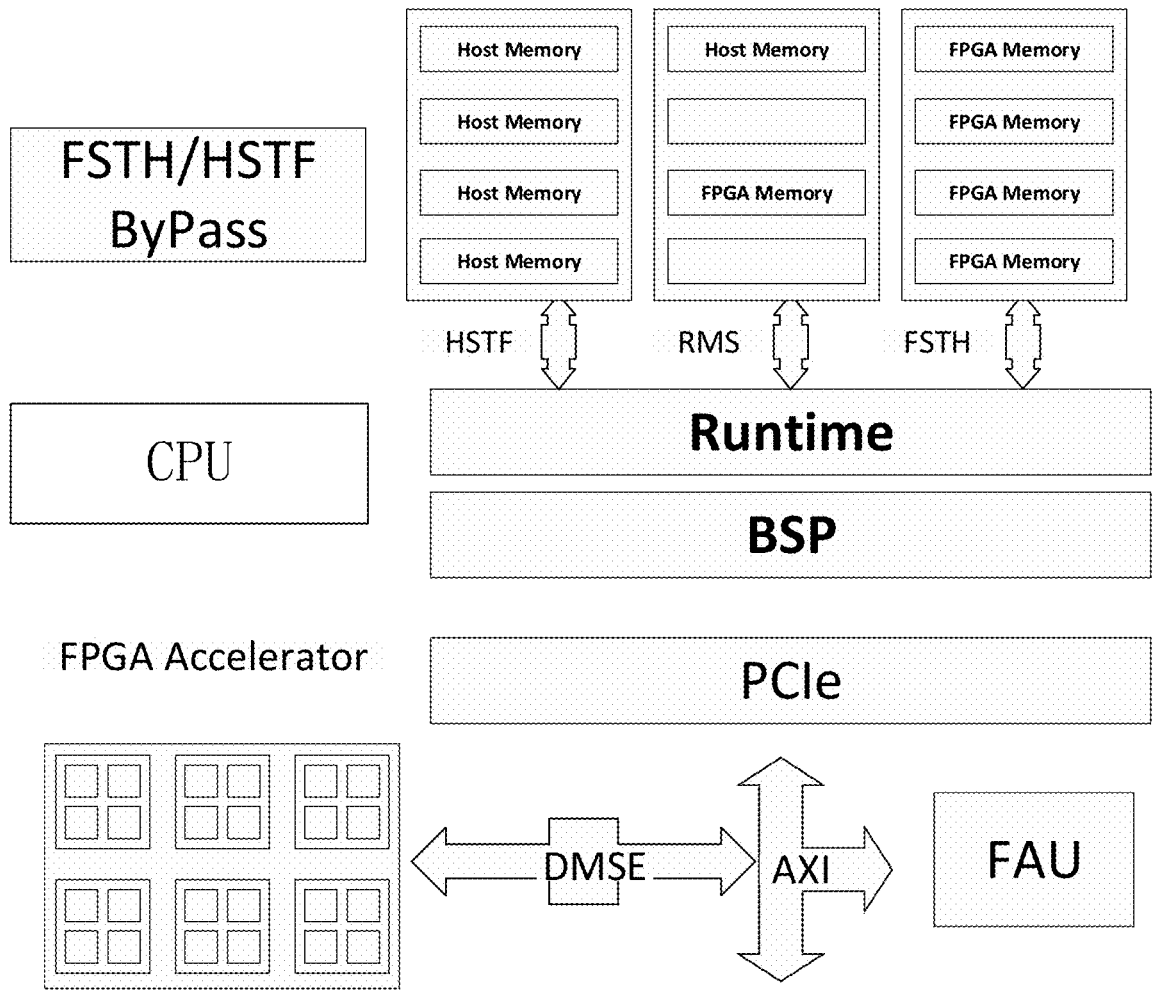
FIG. 4 is a block diagram of a double-end memory synchronization in embodiment 2 of a method for data synchronization between a host side and a FPGA accelerator in a system according to the present application.

FIG. 4 is a block diagram of the DMSE in Runtime of an acceleration system. The DMSE is constructed by logical resources of a FPGA. Taking an Inspur F37X platform as an example, the DMSE establishes a connection with a processor platform to complete data communication through an internal Advanced eXtensible Interface (AXI) bus and a PCIe interface. In FIG. 4, the bottom-left block represents FPGA-based on-board Double Data Rate (DDR), such as a logical unit for neural-network-based reasoning, BSP refers to Board Support Package, Runtime refers to a library (lib) needed by system running, FAU refers to FPGA Accelerator Unit, FSTH refers to FPGA Memory Synchronize to Host Memory, HSTF refers to Host Memory Synchronize to FPGA Memory, RMS refers to Random Memory Synchronization, and ByPass refers to bypass.

Data is acquired from Input/Output (I/O) of the host side and put in the FPGA for processing. During image target recognition, a data frame at a Central Processing Unit (CPU) side may be cached first to a specified memory region of the host side, and then a DMA controller of the FPGA side is called by an instruction to complete migrating data to a specified memory of the FPGA side. In order to improve the data throughput efficiency, typical technical means is to design Pipeline (representing a linear communication model for decelerating a pipeline segment of data between an external program and the host), compress a process clearance, and increase a working density during work.

In order to ensure the consistency and data integrity of memory regions of the processor and FPGA sides, it is necessary to ensure the reliability of a data transmission link. A working process of the DMSE is divided into three stages: a communication link is established in the first stage, data synchronization is performed in the second stage, and the communication link is destructed in the third stage.

Figure 5:
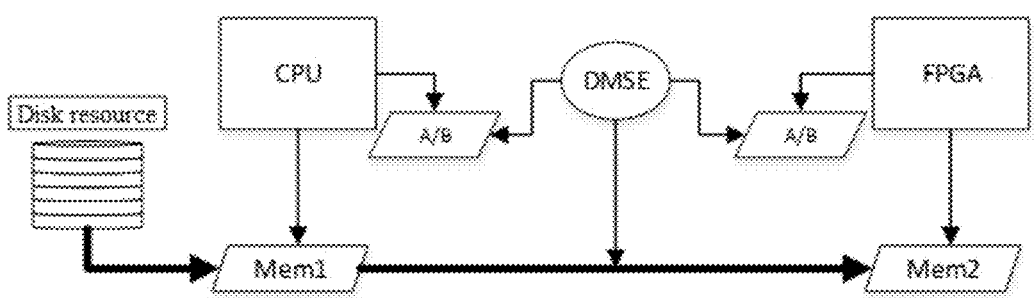
FIG. 5 is a schematic diagram of a working control process of a double-end memory synchronization in embodiment 2 of a method for data synchronization between a host side and a FPGA accelerator in a system according to the present application.

FIG. 5 is a diagram of a working control process of the DMSE, including the following steps. The DMSE reads and writes a flag address space A (i.e., first address space) at the host side mapped by a Bar space, which is equivalent to performing a handshake, so as to establish a memory synchronization communication link between the two CPU and FPGA sides. The DMSE may write nonzero state signal checking information of a length of 8 bytes to the address space A. The host side migrates data to a preset memory space. The host side, after completing migrating the data to the memory, may write two data frame numbers of a length of 4 bytes to a flag address space B (i.e., second address space) at the host side mapped by the Bar space, wherein the first 4 bytes are a present data frame number, and the last 4 bytes are a next data frame number. The DMSE, after reading data in the flag address space B, starts DMA for data migration, and copies the data in the flag address space B to the flag address space A.

It is to be noted that the host side may check numerical values in the address space A, and the DMSE may check numerical values in the address space B. For example, the host may read the values in the address space A for a difference check. The first 4 bytes are a previous data frame number, and the last 4 bytes are the present data frame number. If a difference between data of the first 4 bytes and data of the last 4 bytes is 1, it indicates that the data link is reliable. As a specific implementation mode, the host completes migrating the data to the specified memory space and checking a state of the link asynchronously, and if link state check is not completed within preset time, the data continues to be migrated till an end of a frame. The preset time may specifically be ⅔ of minimum total data transmission time. The amount of migrated data is computable, so the state is detectable. ⅔ is an empirical value, and may be adjusted in practical applications.

When memory data synchronization between the two sides needs to be terminated, a communication link destruction process is required. The operating method is as follows. The host writes two data frame numbers of a length of 4 bytes to the address space B, wherein the data frame number of the first 4 bytes is 0x0000, and the data frame number of the last 4 bytes is 0x0000. The DMSE stops data migration. According to a design requirement, the DMSE may stop data migration actively. For example, the DMSE stops synchronization actively in case of a link failure.

It can be seen that, according to the method for data synchronization between a host side and a FPGA accelerator in the present embodiment, the DMSE is implemented at the FPGA side by use of hardware programmability of the FPGA, and host software only needs to cache data in a disk to a specific memory region, whereby a working process of the host-side software is simplified. Data synchronization is controlled at both sides by the DMSE at the FPGA side.

Specifically, in the present embodiment, a reliable data transmission link is established to simplify a memory synchronization strategy. Meanwhile, a static memory capacity state detection method is designed, and a DMA queue is triggered automatically for bidirectional memory synchronization after memory state transition. Therefore, the memory data synchronization latency of an application system is reduced, and the throughput efficiency of a reasoning system may be improved effectively. According to the present embodiment, problems about high-speed low-latency mutual data synchronization between the FPGA and host sides may be solved effectively, and the throughput efficiency of FPGA-based reasoning may be improved effectively in combination with a Pipeline technology in the fields of video image processing, AI face detection, and image target recognition, etc.

A DMSE provided in an embodiment of the present application will now be introduced. The DMSE described below and the method for data synchronization between a host side and a FPGA accelerator described above may correspondingly refer to each other.

The DMSE of the present embodiment includes:
  a state information writing module, configured to, in response to detection of data migration from a host side to a preset memory space, generate second state information according to first state information in a first address space, and write the second state information to a second address space, wherein the first address space and the second address space are different address spaces at the host side mapped by a Bar space, the first state information includes a previous data frame number and a present data frame number, and the second state information includes the present data frame number and a next data frame number; and
  a data migration module, configured to, in response to detection of the second state information in the second address space, call DMA to migrate data in the preset memory space to a memory space of a FPGA accelerator, and copy the second state information to the first address space, so as to implement synchronization.

The DMSE of the present embodiment is configured to implement the method for data synchronization between a host side and a FPGA accelerator. Therefore, specific implementation modes in the DMSE may refer to the embodiments of the method for data synchronization between a host side and a FPGA accelerator. Therefore, the specific implementation modes may refer to the descriptions about each corresponding embodiment, and will not be introduced herein.

In addition, the DMSE of the present embodiment is configured to implement the method for data synchronization between a host side and a FPGA accelerator, and thus have the same effects as the method. Elaborations are omitted herein.

In addition, the present application also provides a FPGA accelerator, including the DMSE as described above.

Finally, the present application also provides a data synchronization system, including a host side and a FPGA accelerator. The FPGA accelerator includes the DMSE as described above.

Each embodiment in the specification is described progressively. Descriptions made in each embodiment focus on differences with the other embodiments, and the same or similar parts in each embodiment refer to the other embodiments. The apparatus disclosed in the embodiments corresponds to the method disclosed in the embodiments, and thus is described relatively in a brief manner, and related parts refer to part of descriptions about the method.

The steps of the method or algorithm described in combination with the embodiments disclosed herein may directly be implemented by hardware, a software module executed by the processor, or a combination thereof. The software module may be arranged in a Random Access Memory (RAM), an internal memory, a Read-Only Memory (ROM), an electrically programmable ROM, an electrically erasable programmable ROM, a register, a hard disk, a removable disk, a Compact Disc Read-Only Memory (CD-ROM), or a memory medium in any other form well known in this art.

The solutions provided in the present application are introduced above in detail. The principle and implementation modes of the present application are described herein with specific examples. The above descriptions about the embodiments are only for helping in understanding the method of the present application and the core concept thereof. In addition, those ordinarily skilled in the art may make variations to the specific implementation modes and the application scope according to the concept of the present application. In summary, the contents of the specification should not be understood as limits to the present application.

What is claimed is:

1. A method for data synchronization between a host side and a Field Programmable Gate Array (FPGA) accelerator, comprising:
    in response to detection of data migration from the host side to a preset memory space, generating second state information according to first state information in a first address space, and writing the second state information to a second address space, wherein the first address space and the second address space are different address spaces at the host side mapped by a Base Address Register (Bar) space, the first state information comprises a previous data frame number and a present data frame number, and the second state information comprises the present data frame number and a next data frame number; and
    in response to detection of the second state information in the second address space, calling Direct Memory Access (DMA) to migrate data in the preset memory space to a memory space of the FPGA accelerator, and copying the second state information to the first address space, so as to implement synchronization.

2. The method according to claim 1, wherein before the step of generating the second state information according to the first state information in the first address space in response to detection of data migration from the host side to the preset memory space, the method further comprises:
    reading and writing the first address space at the host side mapped by the Bar space to establish a memory synchronization communication link between the host side and the FPGA accelerator.

3. The method according to claim 2, wherein before the step of generating the second state information according to the first state information in the first address space in response to detection of data migration from the host side to the preset memory space, the method further comprises:
    by the host side, reading the first state information from the first address space, determining the previous data frame number and the present data frame number according to the first state information, and judging whether a difference between the previous data frame number and the present data frame number is within a preset threshold to perform a reliability check on the memory synchronization communication link.

4. The method according to claim 3, wherein after the step of judging whether the difference between the previous data frame number and the present data frame number is within the preset threshold to perform the reliability check on the memory synchronization communication link, the method further comprises:
    continuing, by the host side, the data migration to the preset memory space till an end of a frame in response to the memory synchronization communication link not passing the reliability check within a preset time.

5. The method according to claim 4, wherein the method further comprises:
    writing, by the host side, third state information to the second address space so as to terminate synchronization.

6. The method according to claim 4, wherein the method further comprises:
    in response to the memory synchronization communication link passing the reliability check within the preset time, migrating the data to the preset memory space.

7. The method according to claim 3, wherein before the step of calling DMA to migrate data in the preset memory space to the memory space of the FPGA accelerator, the method further comprises:
    acquiring the second state information in the second address space, determining the present data frame number and the next data frame number according to the second state information, and judging whether a difference between the present data frame number and the next data frame number is within the preset threshold to perform the reliability check on the memory synchronization communication link.

8. The method according to claim 7, wherein after the step of judging whether the difference between the present data frame number and the next data frame number is within the preset threshold to perform the reliability check on the memory synchronization communication link, the method further comprises:
    writing third state information to the second address space in response to the memory synchronization communication link not passing the reliability check, so as to stop the operation of calling DMA for data migration.

9. The method according to claim 8, wherein the method further comprises:
    writing, by the host side, the third state information to the second address space so as to terminate synchronization.

10. The method according to claim 8, wherein the method further comprises:
    in response to the memory synchronization communication link passing the reliability check, calling the DMA to migrate the data in the preset memory space to the memory space of the FPGA accelerator, and copying the second state information to the first address space, so as to implement synchronization.

11. The method according to claim 7, wherein the method further comprises:
writing, by the host side, third state information to the second address space so as to terminate synchronization.

12. The method according to claim 3, wherein the method further comprises:
writing, by the host side, third state information to the second address space so as to terminate synchronization.

13. The method according to claim 3, wherein the method further comprises:
reading the second state information first from the second address space, and judging whether a difference between the present data frame number and the next data frame number in the second state information is 1.

14. The method according to claim 13, wherein the method further comprises:
in response to the difference being 1, determining that the memory synchronization communication link is reliable, calling the DMA to migrate the data in the preset memory space to the memory space of the FPGA accelerator, and copying the second state information to the first address space.

15. The method according to claim 2, wherein the method further comprises:
writing, by the host side, third state information to the second address space so as to terminate synchronization.

16. The method according to claim 1, wherein the method further comprises:
writing, by the host side, third state information to the second address space so as to terminate synchronization.

17. A Field Programmable Gate Array (FPGA) accelerator, comprising a Bidirectional Memory Synchronize Engine (DMSE), wherein the DMSE comprises:
a state information writing module, configured to, in response to detection of data migration from a host side to a preset memory space, generate second state information according to first state information in a first address space, and write the second state information to a second address space, wherein the first address space and the second address space are different address spaces at the host side mapped by a Base Address Register (Bar) space, the first state information comprises a previous data frame number and a present data frame number, and the second state information comprises the present data frame number and a next data frame number; and a data migration module, configured to, in response to detection of the second state information in the second address space, call Direct Memory Access (DMA) to migrate data in the preset memory space to a memory space of the FPGA accelerator, and copy the second state information to the first address space, so as to implement synchronization.

18. The FPGA accelerator according to claim 17, wherein the state information writing module is configured to read and write the first address space at the host side mapped by the Bar space to establish a memory synchronization communication link between the host side and the FPGA accelerator before generating the second state information according to the first state information in the first address space in response to detection of data migration from the host side to the preset memory space.

19. A data synchronization system, comprising a host side and a Field Programmable Gate Array (FPGA) accelerator, wherein the FPGA accelerator comprises a Bidirectional Memory Synchronize Engine (DMSE), wherein the DMSE comprises:
a state information writing module, configured to, in response to detection of data migration from the host side to a preset memory space, generate second state information according to first state information in a first address space, and write the second state information to a second address space, wherein the first address space and the second address space are different address spaces at the host side mapped by a Base Address Register (Bar) space, the first state information comprises a previous data frame number and a present data frame number, and the second state information comprises the present data frame number and a next data frame number; and a data migration module, configured to, in response to detection of the second state information in the second address space, call Direct Memory Access (DMA) to migrate data in the preset memory space to a memory space of the FPGA accelerator, and copy the second state information to the first address space, so as to implement synchronization.

20. The data synchronization system according to claim 19, wherein the state information writing module is configured to read and write the first address space at the host side mapped by the Bar space to establish a memory synchronization communication link between the host side and the FPGA accelerator before generating the second state information according to the first state information in the first address space in response to detection of data migration from the host side to the preset memory space.

* * * * *